March 12, 1957　　G. R. BROWNLEE ET AL　　2,784,859
SELF-LOADING AND UNLOADING BALE WAGON
Original Filed April 20, 1955
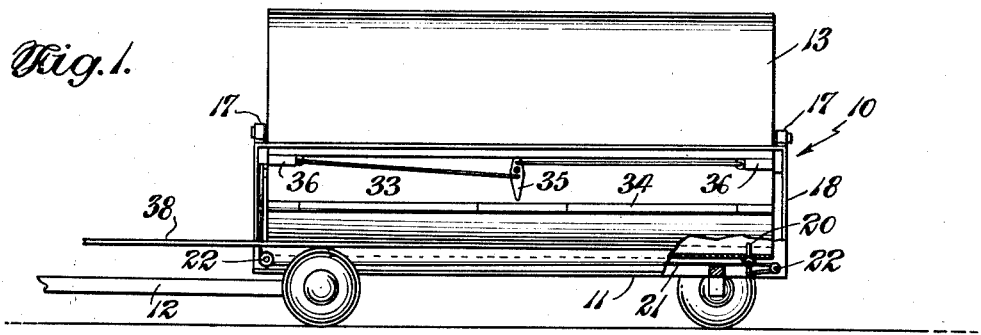
Fig. 1.
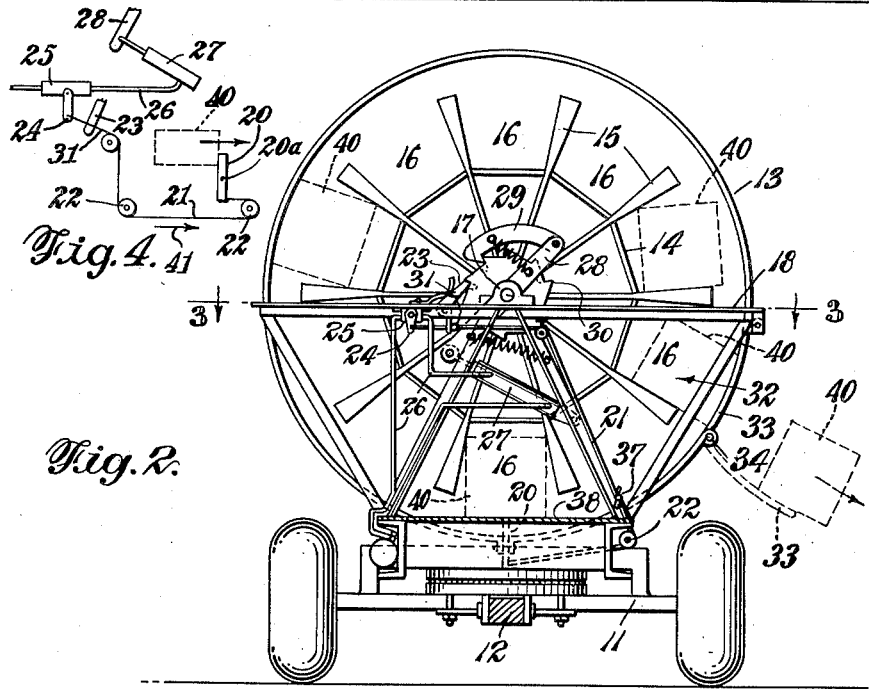
Fig. 2.
Fig. 4.
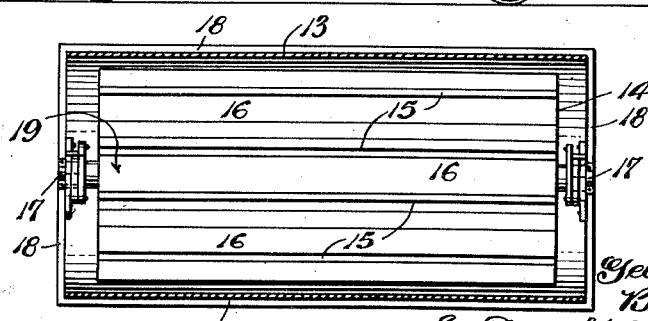
Fig. 3.
INVENTOR
George R. Brownlee,
Donald J. Brownlee.
BY
ATTORNEY

United States Patent Office 2,784,859
Patented Mar. 12, 1957

2,784,859

SELF-LOADING AND UNLOADING BALE WAGON

George R. Brownlee and Donald J. Brownlee,
Sylvia, Kans.

Application July 9, 1956, Serial No. 597,315

5 Claims. (Cl. 214—519)

This invention relates to new and useful improvements and structural refinements in wagons for transporting baled material such as hay, straw, and the like, and the principal object of the invention is to substantially minimize the time and effort required for the loading and unloading of such wagons.

In common practice, a flat bed wagon is usually attached to the rear of an agricultural baler so that bales discharged by the latter may be stacked manually on the bed of the wagon. Moreover, if a wagon does not accompany the baler, the bales are discharged on the ground and subsequently must be picked up and deposited on the wagon for purposes of transportation.

The instant invention eliminates the aforementioned disadvantages by the provision of a wagon having a drum-type magazine equipped with compartments adapted to receive bales directly from the baler, or to pick them up off the ground, as preferred, this operation being accomplished in a systematic fashion without undue loss of time and effort, while the discharging or unloading of the bales from the wagon is effected with equal expedition.

An important feature of the invention resides in the provision of a bale wagon with a compartmented, drum-type magazine for the accommodation and storage of bales therein, together with automatic power actuated means for rotating the magazine structure so that the bales in the various compartments thereof may be successively brought in alignment with bale loading and unloading stations in the magazine.

Some of the advantages of the invention lie in its simplicity of construction, in its efficient operation, in its durability and in its adaptability to economical manufacture.

In particular, this application for patent is a divisional application of my co-pending application serial No. 502,698, filed April 20, 1955, now Patent No. 2,761,578, issued September 4, 1956.

The invention will be understood from the following description taken in conjunction with the accompanying drawing, wherein like characters of reference are employed to designate like parts and wherein:

Figure 1 is a side elevational view of the invention, partially broken away to reveal its construction;

Figure 2 is a front end view thereof;

Figure 3 is a horizontal sectional view, taken substantially in the plane of the line 3—3 in Figure 2; and Figure 4 is a diagrammatic view of the components of the mechanism for actuating rotation of the magazine structure.

Referring now to the accompanying drawing in detail, the bale wagon is designated generally by the reference numeral 10 and embodies in its construction a wheeled chassis 11 having a draw bar 12 at its front end for connection to a baler, and also equipped with a horizontally disposed, drum-type storage magazine 13.

A reel-like frame 14 is rotatably mounted in the magazine 13 and includes a plurality of longitudinally extending partitions 15 which separate the outer portion of the magazine into a plurality of circumferentially arranged bale receiving compartments 16. As will be noted, the frame 14 is supported in suitable bearings 17 on the framework 18 of the chassis 11.

The open-ended magazine or drum 13 affords a loading station or bale entrance 19 at the front thereof, which communicates with the lowermost of the compartments 16 whereby a plurality of bales 40 may be slid longitudinally into that compartment. Means hereinafter described are provided for rotating the frame 14, so that the compartments are shifted circumferentially in the drum 13 and the next successive compartment is brought in alignment with the loading station 19.

These means comprise an actuating finger 20 which is pivotally mounted as at 20a on the bottom of the drum 13 so that it is disposed at the rear end of the lowermost of the compartments 16. A cable 21 is connected at one end thereof to the finger 20 and, after passing over suitably arranged guide pulleys 22, extends through an aperture in a pawl 23 and is connected to the control lever 24 of a hydraulic valve 25. The latter is operatively connected by suitable lines 26 to a source of hydraulic pressure and to a hydraulic cylinder 27 which, in turn, is mounted on the chassis 11 and is connected to a rocker arm 28 coaxial with the bearings 17. The rocker arm 28 is equipped with a spring-controlled pawl 29 which operatively engages a ratchet 30 rotatable with the frame 14. A stop element 31 is secured to the cable 21 adjacent the pawl 23 for a purpose hereinafter to be described.

It will be apparent from the foregoing that when the bales 40 are slid into the lowermost of the compartments 16, the innermost bale will come in contact with the finger 20 and, by exerting pressure thereon, will exert a pull on the cable 21 as indicated by the arrow 41, so as to open the valve 25 and energize the hydraulic cylinder 27. The latter, in turn, will actuate the rocker arm 28 and pawl 29 so as to impart rotation to the ratchet 30 and associated reel frame 14. Simultaneously, the stop element 31 will move with the cable 21 away from the pawl 23 and as the ratchet 30 is rotated, the pawl 23 will be moved radially outwardly by the ratchet teeth and into close proximity with the stop element 31. Since this stop element cannot pass through the aperture in the pawl 23, the cable 21 will hold the valve 25 open, and rotation of the frame 14 will continue until the pawl 23 drops into the next tooth of the ratchet 30. By this time the actuating finger 20 will be free of contact with the bales and returned to its initial position, and as soon as the pawl 23 drops into the next tooth of the ratchet 30, the cable 21 will allow the valve 25 to close and de-energize the cylinder 27. The spacing of the teeth of the ratchet 30 corresponds with the circumferential spacing of the compartments 16, whereby the several compartments are brought successively in alignment with the loading station 19 by successive actuations of the finger 20 by the bales filling the lowermost compartment. Moreover, the pawl 23 functions as an indexing means for locking the reel frame 14 in predetermined positions wherein the respective compartments 16 are aligned with the loading station 19.

To facilitate unloading, an unloading station 32 is provided at one side of the drum 13 in alignment with one of the compartments 16 while the lowermost compartment is aligned with the loading station 19, and the same means, already described, for rotating and indexing the frame 14 with respect to the loading station also operate simultaneously for the unloading station 32. The unloading station is equipped with a suitable door 33 which, in effect, is formed by a portion of the side wall of the drum 13 and is suitably hinged as indicated at 34. The door 33 is equipped with suitable latches 35 operatively connected to an unlocking lever 36, as shown.

Rotation of the frame 14 for unloading purposes is effected by the operator of the wagon after disconnecting the cable 21 at a point indicated at 37, whereupon a suitable pull line (not shown) is attached to the cable at the point 37. Thus, when the line is pulled, the frame 14 is caused to rotate in the same manner as if the cable 21 is pulled by the actuating finger 20.

If desired, the loading platform shown at 38 may extend from the loading station 19 forwardly to the baler, so that bales discharged by the latter may be readily passed through the loading station into the drum 13.

While in the foregoing there has been shown a described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A self loading and unloading bale wagon, comprising a wheeled chassis, a horizontally elongated drum mounted thereon, a reel-like frame rotatably mounted in said drum, said frame including a plurality of longitudinally extending partitions separating the interior of the drum into a plurality of circumferentially arranged bale receiving compartments, a bale loading station provided at one end of said drum in communication with the lowermost compartment therein, means for rotating said frame for bringing said compartments successively in alignment with said loading station, and means for unloading said compartments.

2. The device as defined in claim 1 together with bale actuated means provided in the lowermost compartment of said drum for automatically energizing and de-energizing said means for rotating said frame.

3. The device as defined in claim 1 together with means for locking said frame in predetermined positions wherein one of said compartments is aligned with said loading station.

4. A self loading and unloading bale wagon, comprising a wheeled chassis, a horizontally elongated drum mounted thereon, a reel-like frame rotatably mounted in said drum, said frame including a plurality of longitudinally extending partitions separating the interior of the drum into a plurality of circumferentially arranged bale receiving compartments, a bale loading station provided at one end of said drum in communication with the lowermost compartment therein, a bale unloading station provided at one side of the drum in communication with another compartment therein, means for rotating said frame for bringing said compartments successively in alignment with said loading and unloading stations, and means provided in the lowermost compartment of said drum for automatically energizing and de-energizing said means for rotating said frame.

5. The device as defined in claim 4 together with bale actuated means for locking said frame in predetermined positions wherein one of said compartments is aligned with said loading station and another of said compartments is aligned with said unloading station.

References Cited in the file of this patent

UNITED STATES PATENTS

| | | |
|---|---|---|
| 1,434,504 | Schlafly | Nov. 7, 1922 |
| 1,656,501 | Rienks | Jan. 17, 1928 |
| 2,761,578 | Brownlee et al. | Sept. 4, 1956 |